(12) United States Patent
Palm et al.

(10) Patent No.: US 9,250,006 B2
(45) Date of Patent: Feb. 2, 2016

(54) AIR COOLER HAVING A CONDENSATION TRAP AND METHOD FOR AIR COOLER OPERATION

(71) Applicant: Ford Global Technologies, LLC, Dearborn, MI (US)

(72) Inventors: Jim Raymond Palm, Ypsilanti, MI (US); Charles Allen Cockerill, Brighton, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 13/856,351

(22) Filed: Apr. 3, 2013

(65) Prior Publication Data
US 2014/0298845 A1    Oct. 9, 2014

(51) Int. Cl.
*F02B 29/04* (2006.01)
*F02M 15/00* (2006.01)
*F02B 33/00* (2006.01)
*F25D 21/14* (2006.01)

(52) U.S. Cl.
CPC ............ *F25D 21/14* (2013.01); *F02B 29/0456* (2013.01); *F02B 29/0468* (2013.01); *Y02T 10/121* (2013.01); *Y02T 10/146* (2013.01); *Y10T 137/5762* (2015.04)

(58) Field of Classification Search
CPC ...... F02B 29/04; F02B 37/001; F02B 37/007; F02B 37/013; F02B 29/0412; F25D 21/14; F28B 1/02; F25B 39/04; F25B 39/028; F28F 9/0212

USPC ............... 60/599, 612; 123/563, 542, 562; 165/51, 41, 119, 114, 110, 174
See application file for complete search history.

(56) References Cited

U.S. PATENT DOCUMENTS

| | | |
|---|---|---|
| 4,503,813 A | 3/1985 | Lindberg |
| 4,835,984 A | 6/1989 | Vyavaharkar et al. |
| 6,301,887 B1 | 10/2001 | Gorel et al. |
| 6,748,741 B2 | 6/2004 | Martin et al. |
| 6,978,772 B1 | 12/2005 | Dorn et al. |
| 7,131,263 B1 | 11/2006 | Styles |
| 7,451,750 B1 | 11/2008 | Fox et al. |
| 7,980,076 B2 | 7/2011 | Buia et al. |
| 8,783,233 B2 * | 7/2014 | Cockerill et al. ............ 123/563 |
| 2010/0083941 A1 * | 4/2010 | Kardos ........................ 123/542 |
| 2010/0205949 A1 | 8/2010 | Bolda et al. |
| 2010/0300647 A1 * | 12/2010 | Steurer et al. ................... 165/52 |
| 2011/0094219 A1 | 4/2011 | Palm |
| 2011/0107760 A1 | 5/2011 | Quinn et al. |

FOREIGN PATENT DOCUMENTS

| | | | | |
|---|---|---|---|---|
| EP | 1918546 A1 * | 5/2008 | ............ | F02B 29/04 |
| JP | 2008111429 A * | 5/2008 | ............ | F02B 29/04 |

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

A condensate trap upstream of an engine cylinder is provided. The condensate trap includes a condensate containment shelf positioned within an outlet manifold of an air cooler, above a lower side of the outlet manifold, and extending from a first lateral side of the outlet manifold to a second lateral side of the outlet manifold, the condensate containment shelf and a outlet port housing forming a condensate restriction in direct fluidic communication with an outlet port of the outlet manifold.

19 Claims, 5 Drawing Sheets

AIR COOLER HAVING A CONDENSATION TRAP AND METHOD FOR AIR COOLER OPERATION

FIELD

The present disclosure relates to an air cooler having a condensate trap in an intake system of on engine.

BACKGROUND AND SUMMARY

Compressors are used in engine intake systems to increase the density of the intake air. Consequently, the combustion output may be increased, emissions may be decreased, and/or fuel economy may be increased. However, compressing intake air also increases the temperature of the intake air. This increase in air temperature decreases air density, thereby diminishing some of the gains achieved via compression of the intake air. Therefore, air coolers positioned downstream of compressors may be used to decrease the temperature of compressed intake air in boosted engines. Air coolers may also be used in conjunction with other systems in the vehicle such as exhaust gas recirculation (EGR) systems to decrease the temperature of the exhaust gas delivered to the intake system.

Air coolers, such as charge air coolers, may be designed for specific engine applications. Specifically, the size and geometry of air flow passages in air coolers may be sized for a specific engine or vehicle. When the air coolers are uniquely sized for an engine, the applicability of the air cooler is decreased. For example, if a specified air cooler were used in another engine or vehicle configuration, the engine may experience misfires due to condensation build up caused by the mis-sizing. As a result, combustion efficiency may be decreased. Furthermore, misfires may be exacerbated when the intake air has a high humidity, a large amount of torque is requested by the vehicle operation (e.g., open throttle conditions), and/or during a downshift in a transmission.

The inventors herein have recognized the above issues and developed a condensate trap upstream of an engine cylinder is provided. The condensate trap includes a condensate containment shelf positioned within an outlet manifold of an air cooler, above a lower side of the outlet manifold, and extending from a first lateral side of the outlet manifold to a second lateral side of the outlet manifold, the condensate containment shelf and a outlet port housing forming a condensate restriction in direct fluidic communication with an outlet port of the outlet manifold.

The condensate containment shelf enables condensate to be accumulated during certain operating conditions. Additionally, the condensate restriction reduces the flowrate of the accumulated condensate into the outlet port. As a result, flowrate of condensate into downstream cylinders is reduced, thereby increasing combustion efficiency and reducing emissions. Furthermore, the likelihood of misfires caused by an excess amount of moisture in the cylinders during combustion is also reduced.

In one example, the condensate containment shelf may be arranged at a non-perpendicular angle with regard to a vertical axis. In this way, the shelf passively directs condensate formed in upstream cooling passages to a lower portion of the condensation trap.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-6 are drawn approximately to scale, however other relative dimensions may be used if desired.

DETAILED DESCRIPTION

An air cooler having a condensate trap is described herein. The condensate trap is positioned in an outlet manifold of the air cooler, the condensate trap includes a condensate containment shelf positioned to receive condensate formed in cooling passages upstream of the outlet manifold in the air cooler. The condensate containment shelf enables condensate formed in the cooling passages to be flowed into a desired region of the outlet manifold. Specifically, in one example the condensate containment shelf may be arranged at a non-perpendicular angle with regard to a vertical axis. In this way, the condensate may be passively directed to a lower portion of the outlet manifold. The condensate trap further includes a condensate restriction reducing the flow of condensate into an outlet port of the outlet manifold. The condensate restriction may be formed by an outlet port housing and the condensate containment shelf. The condensate restriction reduces the flowrate of condensate into the outlet port. As a result, flowrate of condensate into downstream cylinders is reduced, thereby increasing combustion efficiency and reducing emissions. Furthermore, the likelihood of misfires caused by an excess amount of moisture in the cylinders during combustion is also reduced.

Figure 1:
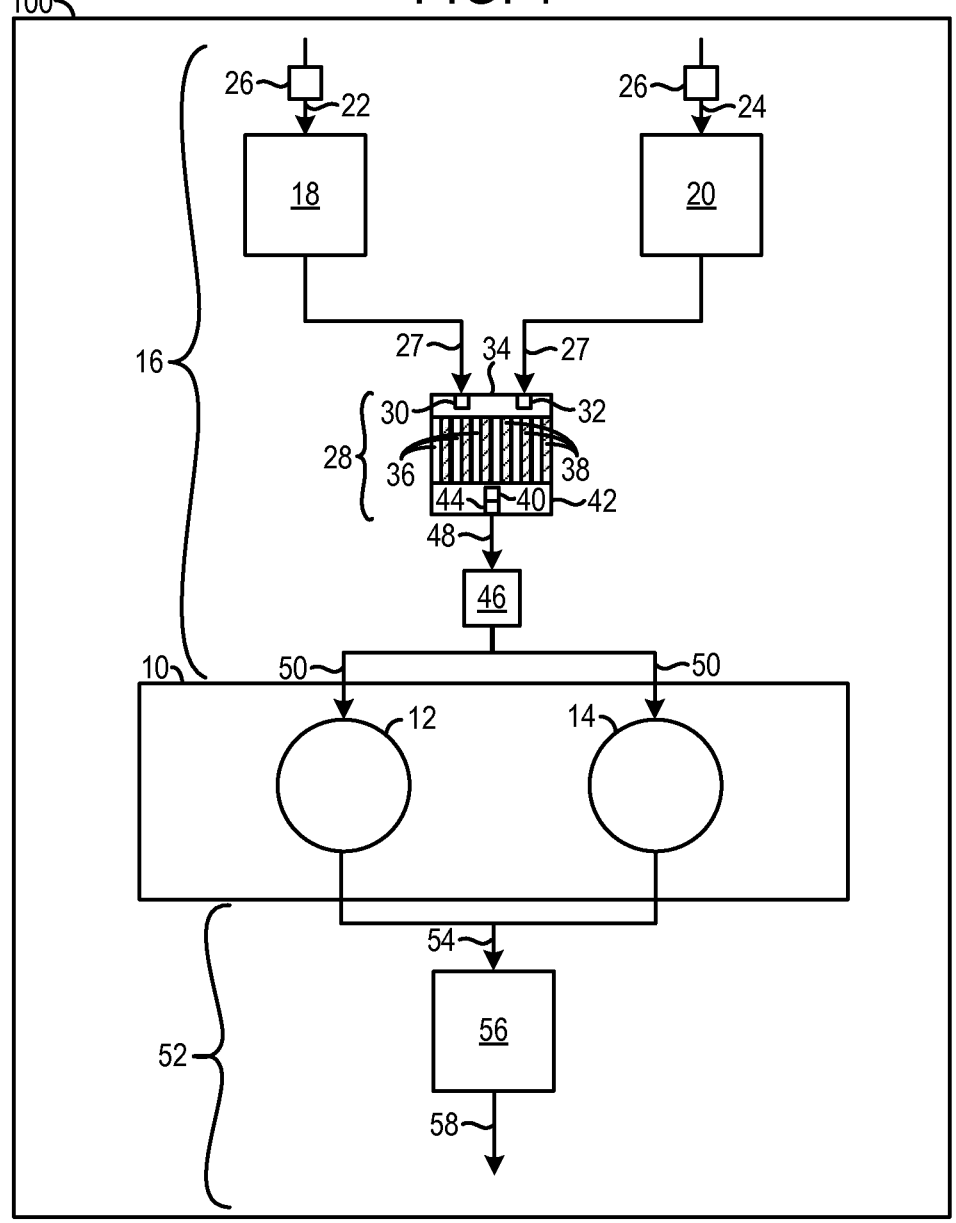
FIG. 1 shows a schematic depiction of a vehicle including an engine and an air cooler having a condensate trap.

FIG. 1 shows a schematic depiction of an engine 10 in a vehicle 100. The engine 10 is configured to provide motive power to the vehicle 100. The engine 10 includes a first cylinder 12 and a second cylinder 14. In some examples, the first cylinder 12 may be included in a first cylinder bank and the second cylinder 14 may be included in a second cylinder bank. Further, it will be appreciated that in other examples each cylinder bank may include a plurality of cylinders. The first cylinder 12 may be arranged at a non-straight angle with regard to the second cylinder 14, in one example. However, other cylinder configurations have been contemplated, such as inline cylinder arrangements, horizontally opposed cylinder arrangements, etc. The cylinders may be referred to as a combustion chamber. The engine 10 is configured to implement a four stroke cycle in each of the cylinders: the cycle includes an intake stroke, compression stroke, expansion stroke, and exhaust stroke.

A fuel delivery system may be included in the engine 10 and may be configured to provide fuel to the cylinder. Port and/or direct injection may be used to provide the metered fuel to the cylinders. Additionally, ignition devices may be coupled to the cylinders (12 and 14) and configured to provide an ignition spark to the combustion chambers. Additionally or alternatively, compression ignition may be used to ignite air/fuel mixtures in the cylinders. Additionally, pistons may be disposed in the cylinder and configured to transfer energy generated in the cylinders to a crankshaft.

An intake system 16 provides intake air to the cylinders (12 and 14) in the engine 10. The intake system 16 includes a first compressor 18 and a second compressor 20. The compressors are arranged in a parallel configuration in the example depicted in FIG. 1. However, in other examples the compressors may be arranged in series. The compressors may be coupled to turbines forming turbochargers or may be coupled to the crankshaft forming superchargers. Arrow 22 denotes the flow of intake air to the first compressor 18 through one or more intake conduits. Likewise, arrow 24 denotes the flow of intake air to the second compressor 20 through one or more intake conduits. Air filters 26 are positioned in the intake conduits denoted via arrows 22 and 24 respectively. The air filters 26 are configured to remove particulates from intake air flowing therethrough.

An air cooler 28 is in fluidic communication with the first compressor 18 and the second compressor 20. Arrows 27 denote one or more intake conduits providing fluidic communication between the compressors and the air cooler 28. In the example engine 10 shown in FIG. 1 including compressors the air cooler 28 may be referred to as a charge air cooler. However, it will be appreciated that the air cooler 28 may be used in non-boosted engines. The air cooler 28 includes a first inlet port 30 and a second inlet port 32. The first inlet port 30 is in fluidic communication with the first compressor 18 and the second inlet port 32 is in fluidic communication with the second compressor 20. The air cooler 28 further includes an inlet manifold 34. The inlet manifold 34 may include the first inlet port 30 and the second inlet port 32.

The inlet manifold 34 receives intake air from the first inlet port 30 and the second inlet port 32. The inlet manifold 34 is in fluidic communication with a plurality of cooling passages 36. The cooling passages 36 are configured to remove heat from the air flowing therethrough. Heat fins 38 or other suitable heat removal devices are coupled to the cooling passages 36. Specifically, the heat fins 38 are positioned between the cooling passages 36 in the depicted example. However, other heat fin arrangements have been contemplated. Airflow may be directed through the heat fins 38 to remove heat from the intake air flowing through the cooling passages 36. In this way, heat may be removed from intake air which may have an elevated temperature caused by compression of the intake air via the compressors. Additionally, during some operating conditions condensate may be formed in the cooling passages during the heat removal process. A condensate trap 40 configured to collect condensate may be included in an outlet manifold 42 of the air cooler 28. The condensate trap 40 is configured to collect condensate in a desired portion of the outlet manifold 42 and reduce the flowrate of condensate from the air cooler 28 to downstream components. As a result, the flowrate of condensate into downstream components, such as cylinders, is reduced, thereby increasing combustion efficiency and decreasing emissions. Additionally, the likelihood of misfires, caused by excess moisture in the air/fuel mixture in the cylinders during combustion, may be reduced by the condensate trap.

The outlet manifold 42 is in fluidic communication with the plurality of cooling passages 36. Thus, air may flow from the plurality of cooling passages 36 into the outlet manifold 42. The outlet manifold 42 and inlet manifold 34 may be directly coupled to the plurality of cooling passages. The outlet manifold includes an outlet port 44.

The outlet port 44 is in fluidic communication with a throttle 46 via one or more intake conduits, denoted via arrow 48. The throttle 46 is configured to alter the downstream pressure in the intake system 16. The throttle 46 is in fluidic communication with the first cylinder 12 and the second cylinder 14 via intake conduits, intake manifolds, etc., denotes via arrows 50.

Furthermore, an exhaust system 52 receives exhaust gas from the cylinders (12 and 14). The arrows 54 denote one or more exhaust conduits, exhaust manifolds, etc. The exhaust system 52 further includes an emission control device 56 in fluidic communication with the first cylinder 12 and the second cylinder 14. The exhaust system 52 may further include a first and second turbine (not shown) coupled to the first and second compressors, respectively. The corresponding turbines and compressors may be included in turbochargers. However as previously discussed the compressor may alternatively be coupled to a crankshaft in the engine. Arrow 58 denotes the flow of exhaust gas from the emission control device 56 to the surrounding environment.

It will be appreciated that the air cooler 28 is schematically depicted in FIG. 1 and that the relative position of the components in the air cooler 28 may be altered, in other examples. FIGS. 2-6 illustrate a detailed example of the air cooler 28.

Figure 2:
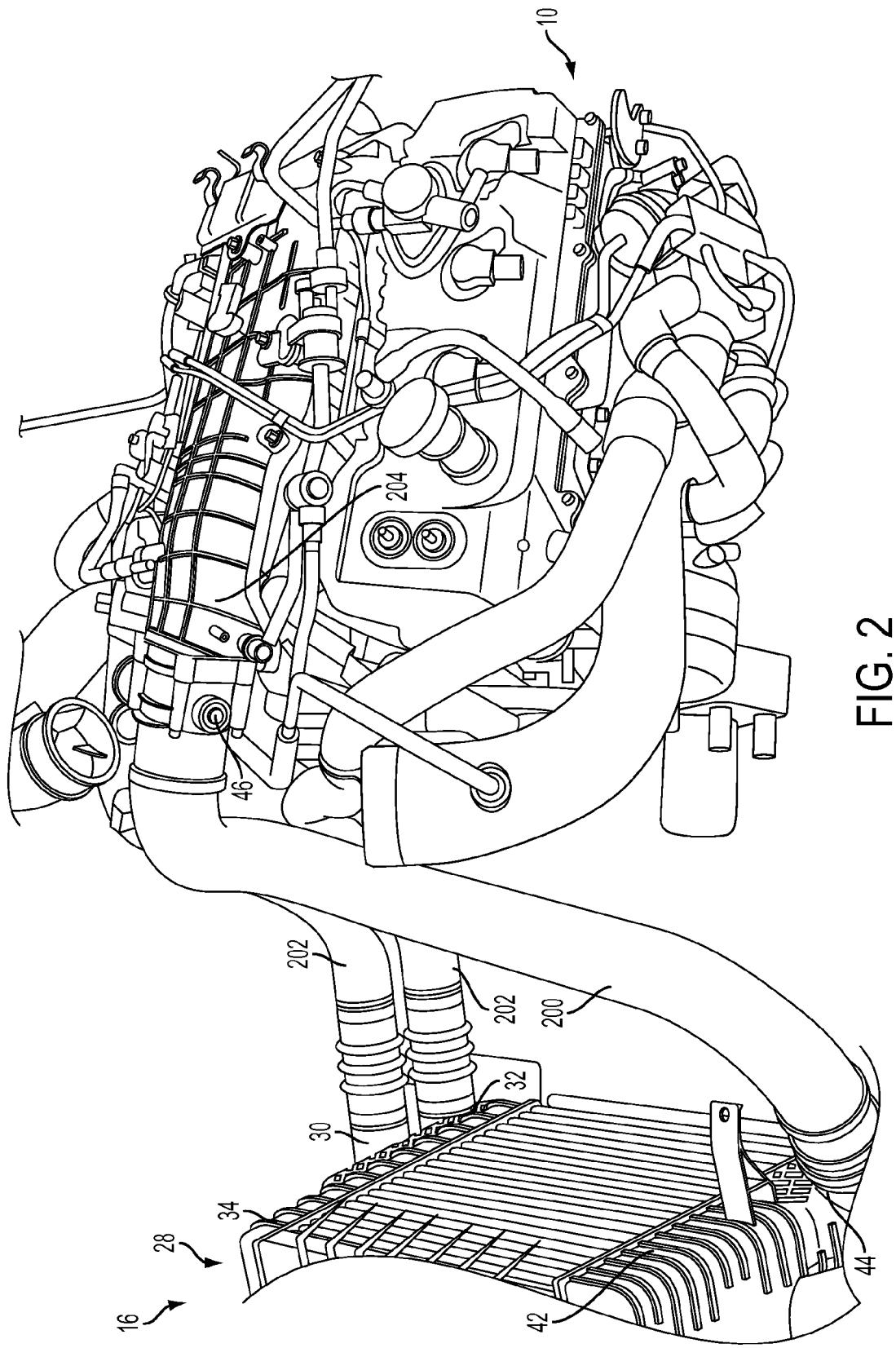
FIG. 2 shows an example intake system included in the vehicle shown in FIG. 1.

Now referring to FIG. 2 which shows an illustration of an example of the engine 10 and the intake system 16, shown in FIG. 1. The air cooler 28 included in the intake system 16 is shown in FIG. 2. As previously discussed, the air cooler 28 includes the first inlet port 30, the second inlet port 32, an inlet manifold 34, an outlet manifold 42, and a plurality of cooling passages 36. As previously discussed, heat fins or other suitable heat removal devices may be coupled to the cooling passages 36. Specifically, in some examples air may be circulated through the heat fins to remove heat from air flowing through the cooling passages.

An intake conduit 200 is directly coupled to the outlet port 44. Likewise, intake conduits 202 are directly coupled to the inlet ports (30 and 32). The throttle 46 is coupled to the intake conduit 200. An intake manifold 204 is positioned downstream of the throttle 46. The intake manifold 204 is configured to provide intake air to cylinders in the engine 10. As shown, the intake manifold 204 may be positioned in a depression between two cylinder banks. However, other intake manifold positions have been contemplated.

Figure 3:
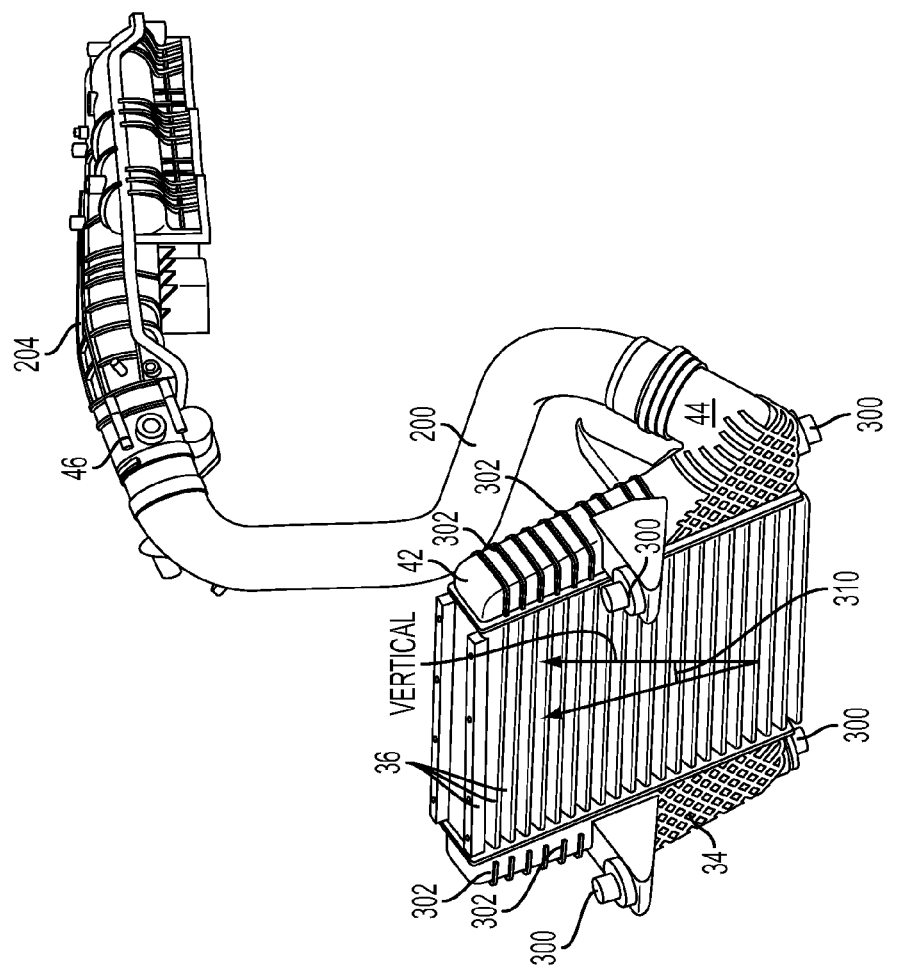
FIG. 3 shows another view of an air cooler, intake conduit, and throttle included in the intake system depicted in FIG. 2.

FIG. 3 shows the air cooler 28, intake conduit 200, throttle 46, and intake manifold 204 shown in FIG. 2. It will be appreciated that the intake manifold 204 depicted in FIG. 3 is in fluidic communication with the cylinders (12 and 14) shown in FIG. 1. Bolts 300 or other suitable attachment apparatuses may be used to secure the position of the air cooler 28 in the intake system. Further, as shown in FIG. 3, the air cooler 28 may be arranged at an angle 310 with regard to a vertical axis. In one example, the angle 310 is 20°. However, other air cooler orientations have been contemplated. For instance, the air cooler 28 may be parallel to the vertical axis.

The cooling passages 36, inlet manifold 34, and outlet manifold 42, in the air cooler 28 are depicted in FIG. 3. The outlet port 44 in the outlet manifold 42 is shown directly coupled to the intake conduit 200. Thus, cooled air flowed through the air cooler 28 may be flowed downstream to cylinders in the engine. Reinforcing ribs 302 are also included in the inlet and outlet manifolds (34 and 42), to provide increased structural integrity.

Figure 4:
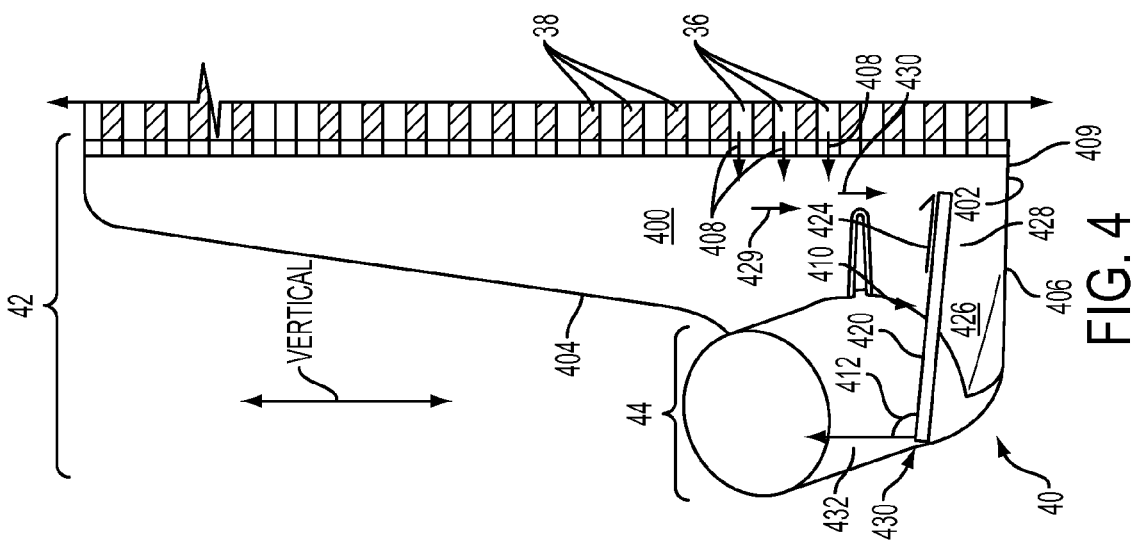
FIGS. 4-6 show different view of an outlet manifold included in the air cooler shown in FIG. 3.

FIG. 4 shows the outlet manifold 42 of the air cooler 28 shown in FIG. 3. As illustrated, the outlet manifold 42 includes the outlet port 44, a first lateral side 400, a second lateral side 402, a longitudinal side 404, and a lower side 406. The lower side 406 includes a lower lowermost interior point 409 of the outlet manifold 42.

The cooling passages 36 are shown in FIG. 4 coupled to the outlet manifold 42. Arrows 408 depict the general flow of intake air out of the cooling passages into the outlet manifold 42. The heat fins 38 are also shown in FIG. 4 positioned between the cooling passages 36. The cooling passages 36 may be arranged at a perpendicular angle with regard a vertical axis. However, other cooling passage orientations have been contemplated.

The outlet port 44 is also illustrated in FIG. 4. As shown, the outlet port 44 extends in a vertical direction. It will be appreciated that the outlet port 44 may be in fluidic communication with downstream cylinders.

The condensate trap 40 is also shown in FIG. 4. The condensate trap 40 includes a condensate containment shelf 410. The condensate containment shelf 410 may be oriented to receive condensate from the cooling passages 36 shown in FIG. 3. An angle 412 between the condensate containment shelf 410 and a vertical axis is shown. Specifically in one example the condensate containment shelf 410 may be oriented at a non-perpendicular angle with regard. For instance, the condensate containment shelf 410 may be arranged between 93°-95° with regard to the vertical axis. The condensate containment shelf 410 is substantially planar in the example depicted in FIG. 4. However, other condensate containment shelf contours have been contemplated. For instance, the condensate containment shelf 410 may be concave or convex.

During some operating conditions the condensate may be generated in the cooling passages 36 and flowed into the outlet manifold 42. Arrows 429 depict a general direction of condensate flow from the cooling passages 36 shown in FIG. 2. Thus, condensate may flow downward in the outlet manifold 44 toward the condensate containment shelf 410. Therefore, a top surface 420 of the condensate containment shelf 410 may receive condensate droplets from the cooling passages 36 positioned vertically above the shelf.

The condensate containment shelf 410 may be oriented at a non-perpendicular angle with regard to the vertical axis. In this way, condensate may be flowed to an end 422 of the condensate containment shelf 410. The end 422 of the condensate containment shelf 410 is spaced away from the outlet port 44. Thus, condensate droplet may fall on the condensate containment shelf and flow toward the end 422 of the shelf Arrow 424 denotes the general direction of condensate flow on the top surface 420 of the shelf. In this way, condensate may be collected in a lower portion 426 of the outlet manifold 42. The lower portion may be referred to as a condensate collection portion. At least part of the boundary of the condensate collection portion may be defined by a housing 428 of the outlet manifold 42.

A condensate restriction 430 is also shown in FIG. 4. The condensate restriction 430 is positioned between the condensate containment shelf 410 and an outlet port housing 432. Thus, a portion of the condensate containment shelf 410 is spaced away from the outlet port housing 432. The condensate restriction 430 reduces the flowrate of condensate into the outlet port 44 from the condensate collection portion positioned below the condensate containment shelf 410.

When the flowrate of the condensate to downstream components from the air cooler is reduced, combustion efficiency is increased, engine emissions are reduced, and the likelihood of cylinder misfires is reduced. Additionally, a mesh or other suitable flow disruptor may be included in the restriction. Thus, a mesh may at least partially span the restriction, in some examples.

Figure 5:
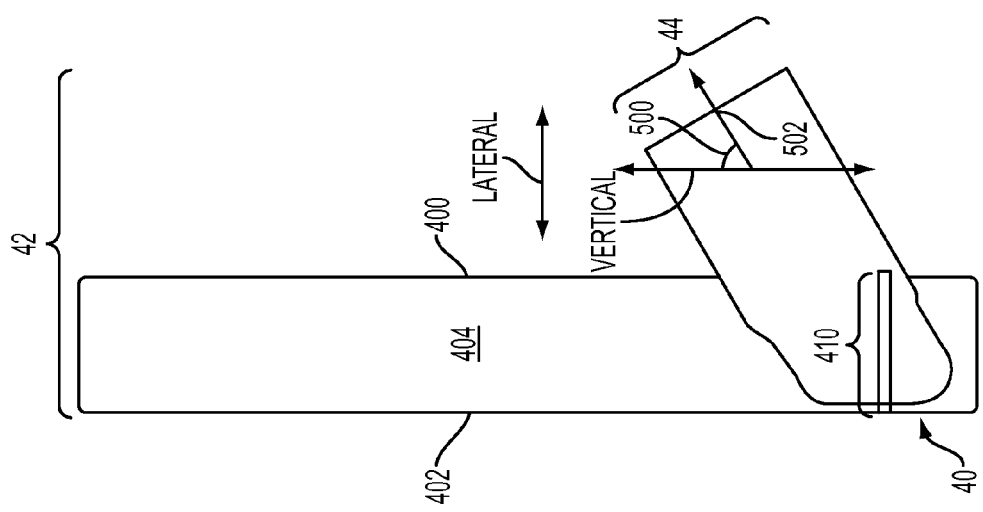

FIG. 5 shows another view of the outlet manifold 42, shown in FIG. 4. As shown, the condensate containment shelf 410 extends between the first lateral side 400 to the second lateral side 402. A lateral axis is provided for reference. The longitudinal side 404 of the outlet manifold is also shown in FIG. 5. An angle 500 between a central axis 502 of the outlet port 44 is also shown in FIG. 5. The angle 500 may be 30°-60°, in one example. However, other suitable angles have been contemplated. The condensate containment shelf 410 and the condensate collection portion 426 are also shown in FIG. 4.

Figure 6:
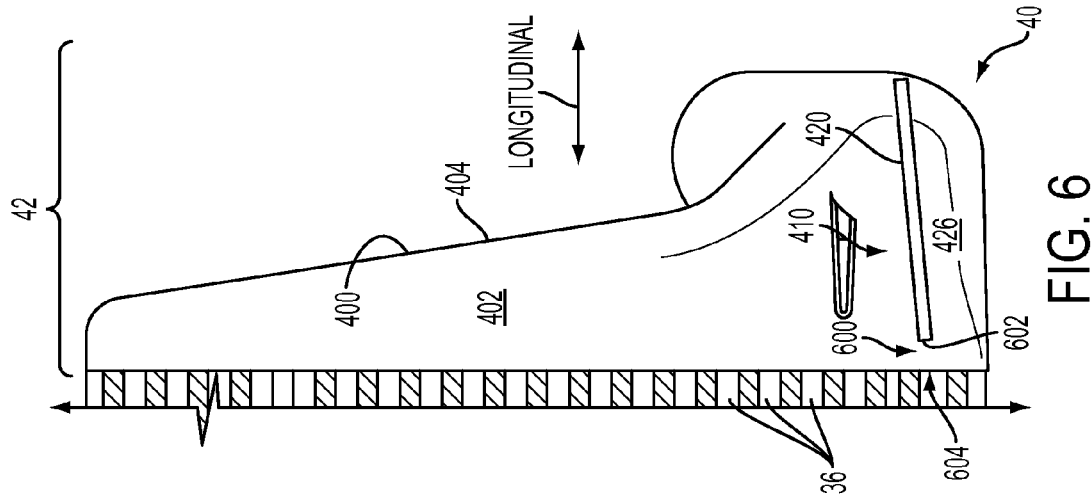

FIG. 6 shows another view of the outlet manifold 42, shown in FIG. 4. The first lateral side 400 and the second lateral side 402 of the outlet manifold 42 are shown in FIG. 6. The first and second lateral sides may be parallel to the cooling passages 36. The longitudinal side 404 of the outlet manifold is also shown in FIG. 5. A longitudinal axis is provided for reference. The condensate trap 40 included in the outlet manifold 42 is also shown in FIG. 6. An opening 600 of the condensate trap 40 is formed between a side 602 of the condensate containment shelf and a cooling conduit outlet 604. The opening 600 enables condensate from the cooling passages 36 to be flowed into the condensate collection portion 426 from the top surface 420 of the condensate containment shelf 410. The opening 600 functions as an inlet for the condensate collection portion 426. A cross-sectional area of the opening 600 may be greater than a cross-sectional area of the condensate restriction 430, shown in FIG. 4. In this way, condensate may accumulate during certain operating conditions. Specifically, condensate may accumulate in the condensate collection portion 426 when the speed of the air flowing through the air cooler is below a threshold value and condensate may flow out of the condensate collection portion when the speed of the air flowing through the air cooler is greater than the threshold value.

Figure 7:
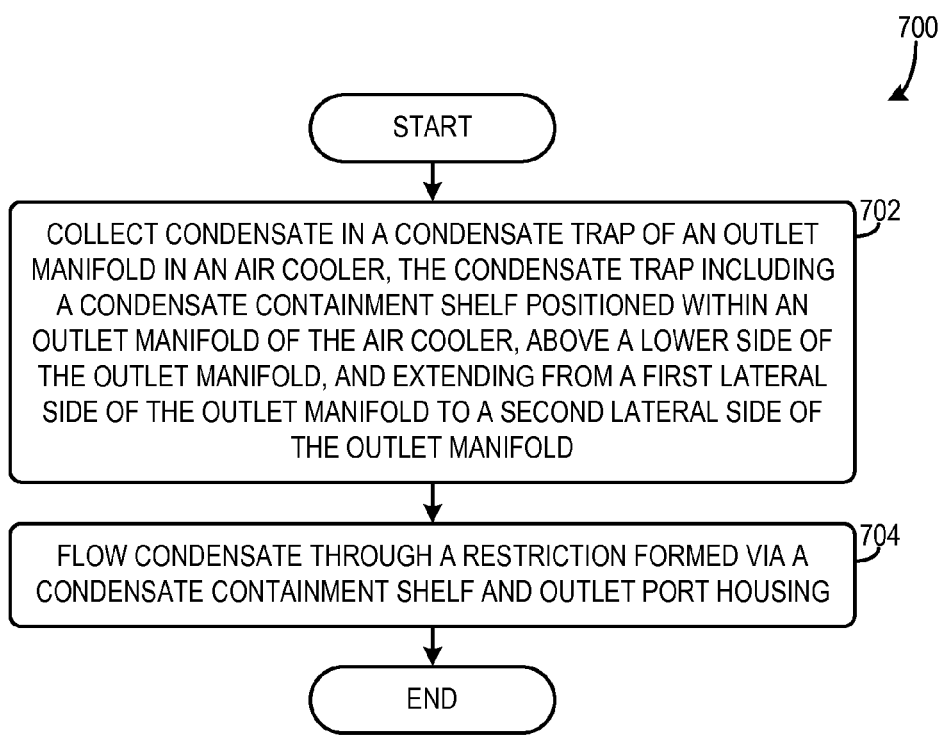
FIG. 7 shows an engine method.

FIG. 7 shows a method 700 for operation of an air cooler. The method 700 may be implemented by the engine and air cooler discussed above with regard to FIGS. 1-6 or may be implemented via another suitable engine and air cooler.

At 702 the method includes collecting condensate in a condensate trap of an outlet manifold in an air cooler, the condensate trap including a condensate containment shelf positioned within an outlet manifold of the air cooler, above a lower side of the outlet manifold, and extending from a first lateral side of the outlet manifold to a second lateral side of the outlet manifold. In one example, the condensate containment shelf is arranged at a non-perpendicular angle with regard to a vertical axis. In another example, the air cooler is positioned downstream of a compressor.

Next at 702 the method includes flowing condensate through a restriction formed via a condensate containment shelf and outlet port housing. In one example, step 702 may be implemented when the volumetric airflow through the outlet port is greater than a threshold value.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a charge air cooler, comprising:
   collecting condensate in a condensate trap of an outlet manifold in the charge air cooler, the condensate trap including a condensate containment shelf positioned within the outlet manifold of the charge air cooler, a top surface of the condensate containment shelf positioned above a lowermost interior point of the outlet manifold and below a topmost cooling passage of a plurality of cooling passages of the charge air cooler, and extending from a first lateral side of the outlet manifold to a second lateral side of the outlet manifold;
   flowing condensate through a restriction formed between the condensate containment shelf and an outlet port housing of an outlet port of the outlet manifold; and
   where the condensate containment shelf is positioned at a downstream end of the outlet manifold, the downstream end including the lowermost interior point and the outlet port of the outlet manifold, where the condensate containment shelf, between a first side of the shelf arranged proximate to the outlet port housing and a second side of the shelf arranged proximate to but spaced away from a cooling conduit outlet of one of the plurality of cooling passages, is arranged at a non-perpendicular angle with regard to a vertical axis, and where collecting condensate includes flowing condensate on the top surface from the first side to the second side of the condensate containment shelf and into a condensate collection portion of the trap formed by a housing of the outlet manifold and the condensate containment shelf, where an inlet to the condensate collection portion is formed between the cooling conduit outlet and the second side of the condensate containment shelf.

2. The method of claim 1, where the condensate collection portion of the trap is formed by a housing of a lower portion of the outlet manifold and a bottom surface of the condensate containment shelf, where the lowermost interior point is included in the lower portion of the outlet manifold, and where flowing condensate through the restriction includes flowing condensate through the restriction when volumetric airflow through the outlet port is greater than a threshold value.

3. The method of claim 1, where the charge air cooler is positioned downstream of a compressor.

4. A condensate trap upstream of an engine cylinder, comprising:
   a condensate containment shelf positioned within an outlet manifold of a charge air cooler, at a downstream end of the outlet manifold, the downstream end including a lowermost interior point and outlet port of the outlet manifold, a top surface of the condensate containment shelf positioned vertically above the lowermost interior point and below a topmost cooling passage of cooling passages of the charge air cooler, and extending from a first lateral side of the outlet manifold to a second lateral side of the outlet manifold, the condensate containment shelf and an outlet port housing forming a condensate restriction in direct fluidic communication with the outlet port, where the condensate containment shelf, between a first side and a second side of the condensate containment shelf, extends across the outlet manifold from the outlet port to outlets of the cooling passages, where the first side of the condensate containment shelf is proximate to the outlet port and the second side of the condensate containment shelf is proximate to the cooling passages, and where the condensate containment shelf, between the first side and second side of the condensate containment shelf, is arranged at a non-perpendicular angle with regard to a vertical axis so that the shelf is angled downward from the first side to the second side of the condensate containment shelf, toward the lowermost interior point.

5. The condensate trap of claim 4, where airflow through the cooling passages is perpendicular to the vertical axis.

6. The condensate trap of claim 5, where the first side of the condensate containment shelf is a downstream end of the condensate containment shelf and where an angle measure between the first side of the condensate containment shelf and the vertical axis is 93-95 degrees.

7. The condensate trap of claim 5, wherein the condensate containment shelf extends from the first lateral side to the second lateral side of the outlet manifold, in a direction perpendicular to airflow through the cooling passages of the charge air cooler, where the condensate restriction is formed between the first side of the condensate containment shelf and the outlet port housing, and where the second side of the condensate containment shelf is spaced away from the outlets of the cooling passages.

8. The condensate trap of claim 7, where the outlet manifold is in fluidic communication with the cooling passages, at least a portion of the cooling passages is positioned vertically above the top surface of the condensate containment shelf and wherein the outlet port is positioned vertically below the topmost cooling passage of the cooling passages, with respect to the vertical axis.

9. The condensate trap of claim 8, where an opening is formed between the second side of the condensate containment shelf and a cooling conduit outlet of one of the cooing passages and where the outlet port is positioned proximate to the condensate containment shelf.

10. The condensate trap of claim 8, where the first and second lateral sides appose one another across the outlet manifold and each extends across a lateral axis of the outlet manifold and extends from a top to a lower side of the outlet manifold, where the lateral axis is perpendicular to a direction of airflow through the cooling passages.

11. The condensate trap of claim 4, where the outlet port extends in a vertical direction.

12. The condensate trap of claim 11, where a central axis of the outlet port and a vertical axis form an angle between 30° and 60°.

13. The condensate trap of claim 4, where the condensate trap is positioned downstream of a compressor and where the charge air cooler is angled from a vertical axis.

14. The condensate trap of claim 4, where the condensate containment shelf is planar and wherein a condensate collection portion of the condensate trap is formed below the top surface of the condensate containment shelf, between a housing of a lower portion of the outlet manifold and the condensate containment shelf.

15. A charge air cooler in an engine comprising:
a plurality of cooling passages;
an outlet manifold directly coupled to the plurality of cooling passages, a downstream end of the outlet manifold including an outlet port and a lowermost interior point of the outlet manifold; and
a condensate trap in fluidic communication with the plurality of cooling passages and including a condensate containment shelf positioned within the outlet manifold, at the downstream end of the outlet manifold, above the lowermost interior point and below a topmost cooling passage of the plurality of cooling passages, and extending from a first lateral side of the outlet manifold to a second lateral side of the outlet manifold, the condensate containment shelf and an outlet port housing forming a restriction in direct fluidic communication with the outlet port of the outlet manifold, where the condensate containment shelf, from a first side to a second side of the condensate containment shelf, extends across the outlet manifold from the outlet port toward a cooling conduit outlet of one cooling passage of the plurality of cooling passages positioned in a lower portion of the outlet manifold, the lower portion of the outlet manifold positioned below the topmost cooling passage, and where the condensate containment shelf is arranged at a non-perpendicular angle with regard to a vertical axis so that the shelf is angled downward from the first side to the second side of the condensate containment shelf, toward the lowermost interior point.

16. The charge air cooler of claim 15, where the condensate trap includes an opening formed between the second side of the condensate containment shelf and the cooling conduit outlet.

17. The charge air cooler of claim 16, where a cross-sectional area of the opening is greater than a cross-sectional area of the restriction.

18. The charge air cooler of claim 15, where the vertical axis is arranged perpendicular to air flowing through the plurality of cooling passages and where the first side of the condensate containment shelf is proximate to the outlet port and the second side of the condensate containment shelf is proximate to the cooling conduit outlet of the one cooling passage of the plurality of cooling passages positioned in the lower portion of the outlet manifold.

19. The charge air cooler of claim 15, where the outlet port extends in a vertical direction and where the outlet port is positioned upstream of an engine cylinder.

* * * * *